April 11, 1933.  H. H. ALEXANDER ET AL  1,903,497
METALLURGY OF COPPER
Filed Feb. 5, 1931  3 Sheets-Sheet 1

INVENTOR
HARRY H. ALEXANDER
ALEXANDER W. CARROLL
BY
ATTORNEYS

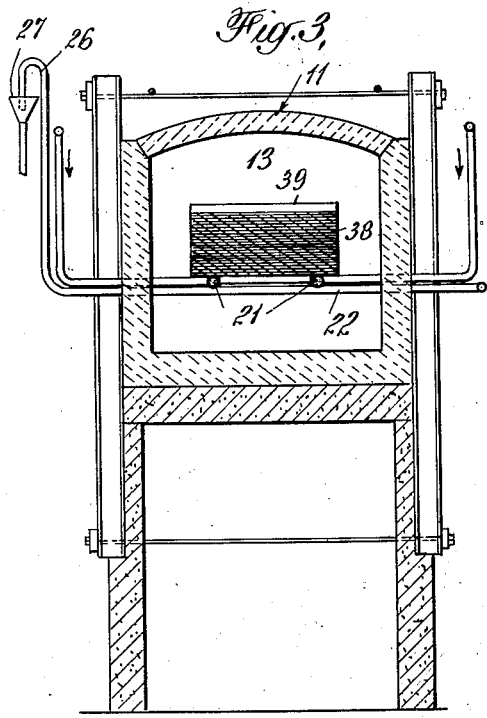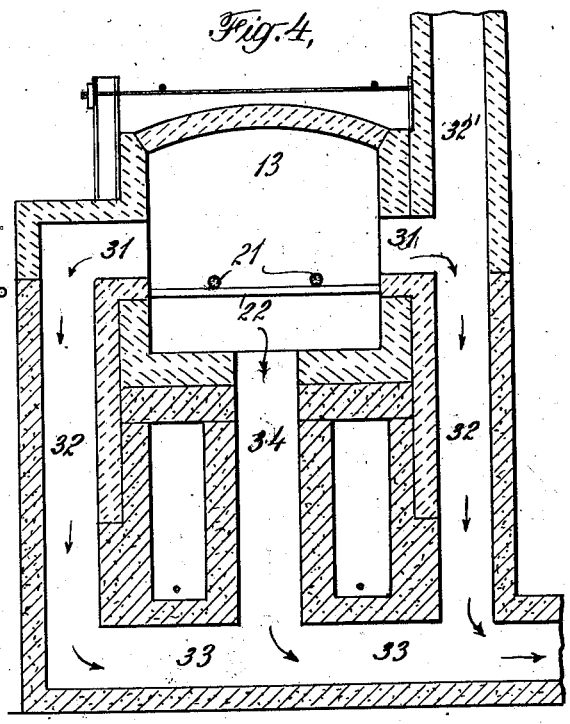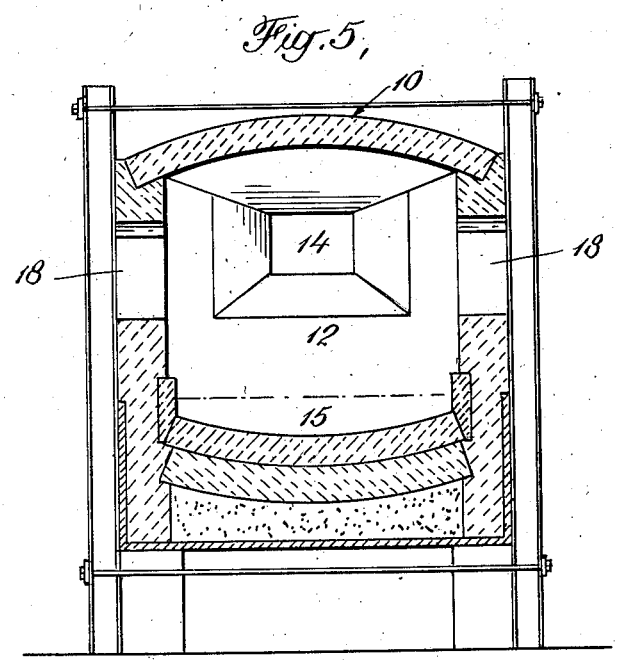

April 11, 1933.   H. H. ALEXANDER ET AL   1,903,497
METALLURGY OF COPPER
Filed Feb. 5, 1931   3 Sheets-Sheet 3
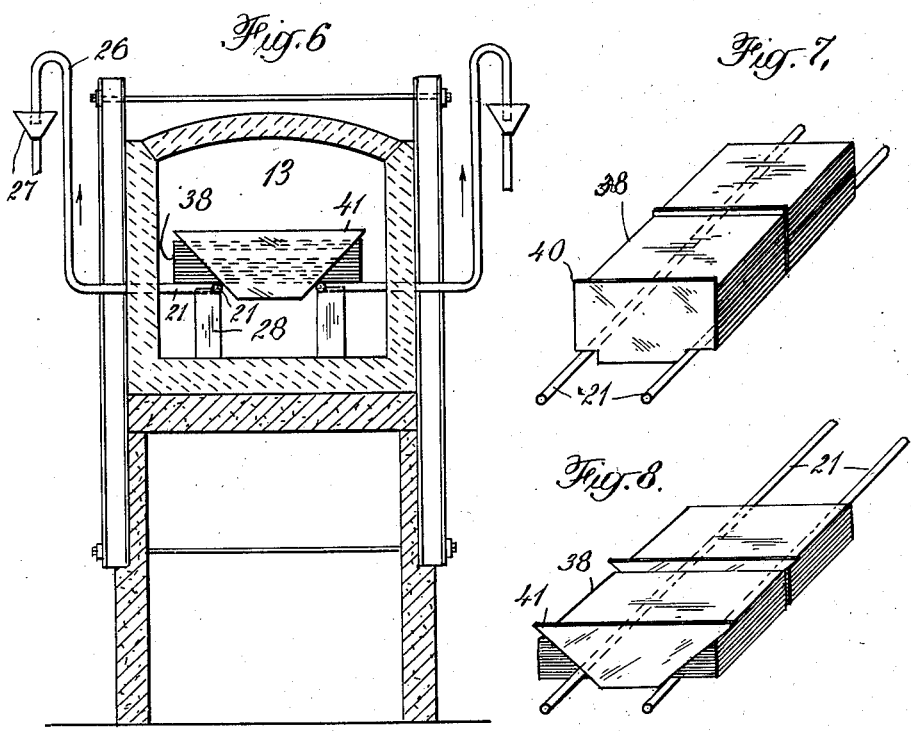
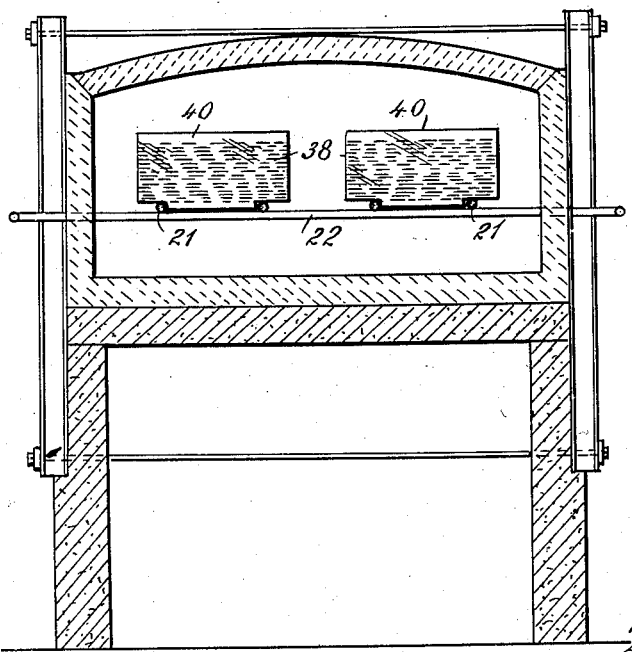
INVENTOR
HARRY H. ALEXANDER
ALEXANDER W. CARROLL
BY
ATTORNEYS Patented Apr. 11, 1933

1,903,497

UNITED STATES PATENT OFFICE

HARRY H. ALEXANDER, OF WESTFIELD, AND ALEXANDER W. CARROLL, OF ELIZABETH, NEW JERSEY; HENRY L. WHEELER, JR., OF ELIZABETH, NEW JERSEY, EXECUTOR OF SAID ALEXANDER W. CARROLL, DECEASED, ASSIGNOR TO SAID HARRY H. ALEXANDER

METALLURGY OF COPPER

Application filed February 5, 1931. Serial No. 513,488.

This invention relates to the metallurgy of copper and has for its object certain improvements in the refining of copper. The invention relates more particularly to improvements in a method of and apparatus for refining copper.

Various proposals have been advanced for the refining of copper. Crude copper as it comes from a furnace is contaminated with impurities that render it unsuitable for most purposes. This crude copper is frequently subjected to an oxidizing operation to effect partial if not complete purification. It is aimed to oxidize the impurities so that they will ultimately find their way into a slag maintained on the top of the copper undergoing the purification treatment process. The molten copper is then usually subjected to a "poling" operation, in which it is aimed to correct any results of over-oxidation. The thus purified copper is either cast into ingots or the like and used as such in commerce, or it is subjected to a further purification operation.

After the molten copper has been "poled" it is frequently cast into anodes. The copper anodes are subsequently subjected to an electrolytic refining operation. As the anode copper goes into solution, copper cathodes are formed, leaving a substantial portion of the impurities behind. The copper cathodes, while substantially purer than the crude copper coming from the reduction furnace, may nevertheless contain impurities in sufficient amount to make them objectionable for certain uses. In that case the impure copper is generally submitted to a further "poling" operation to remove further impurities. Such a procedure is costly and not highly efficient.

Copper cathodes have been subjected to various further purification operations. For example, the copper may be remelted and again subjected to an oxidizing and/or reducing environment to effect further purification. In United States Patent No. 1,687,277 of Harry H. Alexander, one of the present coapplicants, a process for the refining of copper is disclosed and claimed that is particularly adapted for the further refining of copper cathodes. The patent contemplates a method of melting and refining copper in which hot combustion gases are impinged against the surface of a charge of copper, thereby progressively melting the copper. The combustion gases are at the same time made to function as a purifying atmosphere. The purifying atmosphere is controlled by regulating the amount of air and fuel used in the formation of the combustion gases in accordance with the nature and composition of the impurities present in the charge; the regulation is further effetced in accordance with periodic determinations of the character and amount of impurites present in the molten copper. The control is so carefully and minutely manipulated that the chemically reactive quality of the combustion gases may be maintained, for example, in substantial chemical equilibrium with the copper, but oxidizing with respect to the impurities.

In accordance with the practice outlined in said Patent No. 1,687,277 a copper product may be obtained that is at least as pure as that now obtained in customary methods of poling and fire refining but at a reduction in cost. A better copper product may in some instances be obtained at no greater cost.

As a result of our investigations, we have discovered certain improvements in the process of and apparatus for refining copper that tend materially to lower the costs of producing substantially pure copper. The refining operation contemplated may be conducted substantially continuously.

According to the present invention, a plurality of copper sheets, slabs, ingots, cathodes or the like, are subjected to a preheating operation while they are progressively advanced to a refining furnace, in a manner to minimize the amount of labor and materials ordinarily required.

While the process of the invention is applicable to the handling and treatment of copper sheets, slabs, ingots, or the like, generally, we have in mind its application particularly to the treatment of copper cathodes. It is not uncommon for copper cathodes to measure three feet square and one-half to three-quarter inch in thickness, often weighing from 150 to 200 pounds each. In accordance with the practice of the present invention, stacks of such copper cathodes may be progressively advanced through a preheating chamber in the course of their transit to a refining furnace. Thus, a number of the cathodes may be piled on top of one another to form a stack consisting of ten or more cathodes, for example. A series of such stacks are simultaneously passed through the preheating chamber. In order to avoid buckling and telescoping of the stacks into one another, one or more upright cathodes are advantageously placed between stacks of cathodes. Suitable means are employed to push or otherwise forward the stacks of cathodes through the length of the preheating chamber.

Economy in heat is effected by employing hot gases coming from the refining furnace to preheat the cathodes during their movement through the preheating chamber. To accomplish this desirable result, the hot gases are permitted to play on the exposed surfaces of the cathodes. A maximum of cathode surface should be brought into direct contact with the heating gases consistent with any given set of operating conditions. It is aimed to have the cathodes preheated to a temperature short of their melting point, or at least not much beyond a slight melting of corners and the like, by the time they reach the far end of the preheating chamber.

At this point, the preheated cathodes are deposited, dropped or otherwise placed in the refining furnace. In the present preferred practice of the invention, the preheated cathodes are dropped from the preheating chamber onto a draining shelf located at a level somewhat higher than that of a pool of molten copper maintained within the furnace.

According to this preferred practice, the refining furnace is of the reverberatory type in structure. Hot combustion gases of regulated composition and temperature are formed by a minute and accurate control of air and fuel brought together in the furnace. These hot combustion gases are permitted to play on the exposed surfaces of the copper cathodes resting on the draining shelf. As copper melts and trickles away from the copper cathodes, the desired purification step takes place. The purified copper ultimately flows to and merges with a pool of molten copper maintained in the furnace. A protective molten slag is advantageously provided on the top of the pool of molten copper.

As the hot combustion gases contact with the copper cathodes resting on the draining shelf in the refining furnace, a substantial portion of their heat is transferred to the cathodes. The gases are nevertheless still highly heated. Due to the type of construction contemplated by the invention, these relatively hot and partially spent heating gases are permitted to enter the preheating chamber where they contact with the incoming stacks of copper cathodes. By the time the gases have reached the far end of the channel-like preheating chamber, they have given up a very considerable portion of their available heat. The spent gases are finally permitted to escape through a stack or chimney into the open atmosphere.

A suction draft is advantageously maintained in the chimney or stack so that the hot combustion gases will continuously move from the refining furnace to and through the preheating chamber, and then up the stack or flue. A fan is preferably employed in conjunction with the stack or chimney to induce the necessary draft.

These and other advantages of the invention will undoubtedly be better understood if reference is made to the accompanying drawings, taken in conjunction with the following description, in which:

Fig. 3 is an end elevation in section on the line 3—3 of Fig. 1;

Fig. 4 is an end elevation in section on the line 4—4 of Fig. 1;

Fig. 5 is an end elevation in section on the line 5—5 of Fig. 1;

Fig. 6 is an end elevation in section, somewhat similar to Fig. 3, showing a modified arrangement;

Fig. 7 is a perspective view of the present preferred manner of stacking copper cathodes;

Fig. 8 is a perspective view showing a modification for stacking copper cathodes; and Fig. 9 is a transverse section of a preheating chamber, similar to Figs. 3 and 6, showing another modified arrangement.

Figure 1:
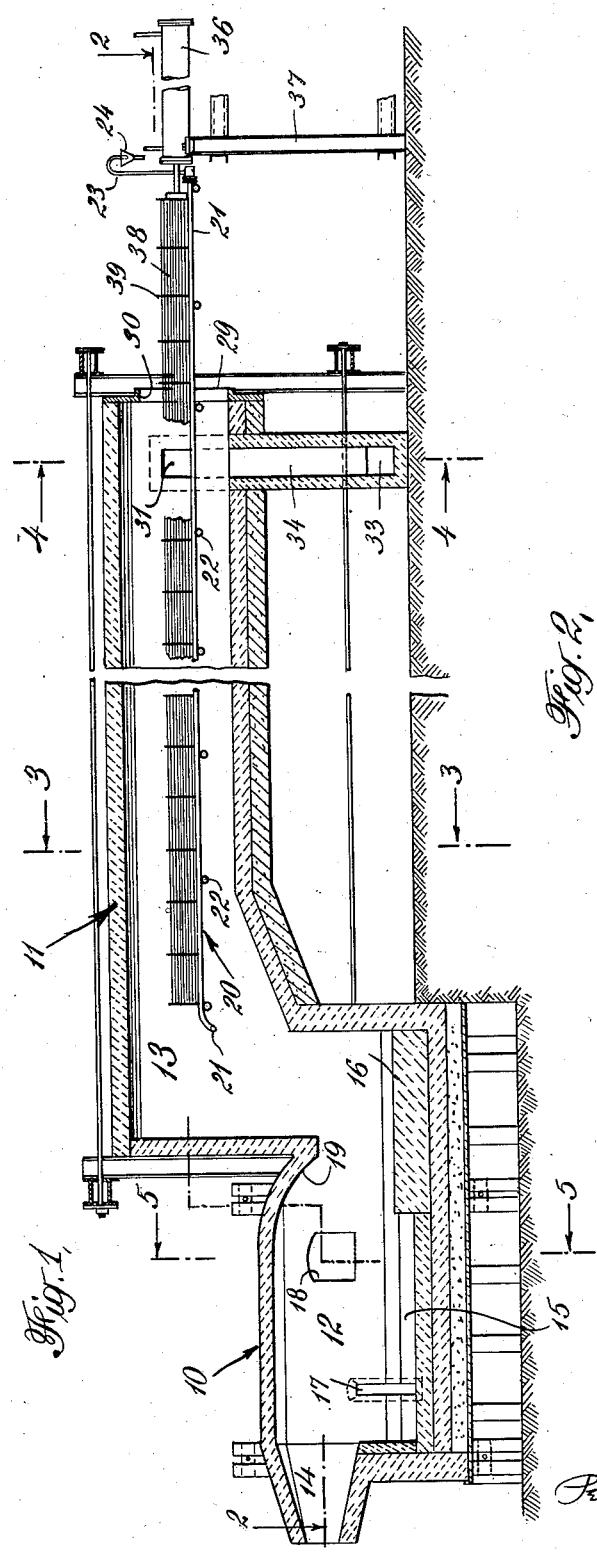
Fig. 1 is a side elevation in section of an apparatus adapted for and illustrative of the practice of the invention.

The apparatus shown (see Figs. 1 and 2) comprises an appropriately supported and constructed refining furnace 10 of the reverberatory type, and a preheating chamber structure 11. A refining furnace chamber 12 communicates openly with a tunnel-like passageway 13 of the preheating chamber. The bottom of the preheating chamber passageway slopes toward the refining furnace chamber as shown.

The refining furnace is provided with a telescoping opening 14 adapted for association with a burner, or burners (not shown). A burner is employed that is designed to supply combustible, or heat supplying, fuel and air in appropriate amounts to the furnace chamber. Any suitable fuel of good purity may be employed.

A well or reservoir 15 is provided at the bottom of the furnace chamber to collect molten copper and slag, which runs down or trickles away from a draining shelf or hearth 16. This draining shelf or hearth may advantageously have a slight slope toward the well or reservoir to assist the flow of molten copper. An opening 17 is provided for the removal of copper and slag from the well or reservoir. Suitable plugs (not shown) are employed for closing this opening.

A door or opening 18 is also provided in both the opposite walls above the reservoir level of the refining furnace. This opening is to give access to the interior of the furnace, and may be suitably closed during refining operations. The top or ceiling of the furnace has a downwardly deflecting section 19 adapted to direct combustion gases downwardly toward the draining shelf or hearth and thus contact with cathodes resting thereon. The furnace walls, ceiling and bottom are constructed of the usual refractory materials used in conjunction with this type of reverberatory furnace.

The preheating chamber is likewise lined with suitable refractory material. The chamber is provided with a runway structure 20 running lengthwise of its tunnel-like passageway, and is so spaced from the bottom, side walls and top or ceiling of the chamber that heating gases may freely circulate around the same. In the apparatus shown more particularly in Figs. 1, 2, 3, 4, 6 and 9, the runway structure consists of longitudinally spaced hollow pipes 21 appropriately supported on laterally spaced hollow pipes 22. In the case of the longitudinally disposed pipes connection is made with a water supply main at the end nearest to the refining furnace, and an inverted U-shaped pipe 23 is located at the other end for the escape of water into a funnel-shaped sump 24. The inverted U-shaped pipe is located at a level above that of the longitudinal pipes.

In the case of the laterally disposed hollow pipes, provision is also made for circulating cooling water therethrough. Each of the pipes connects with a water supply main 25 running parallel to the outside of the preheating chamber. At the other side of the chamber the lateral pipes terminate in an inverted U-shaped pipe member 26 associated with a funnel-like sump 27. The lateral pipes are supported by the side walls of the preheating chamber.

In the construction shown in Fig. 6, the longitudinally disposed pipes are appropriately supported on spaced piers 28 resting on the bottom of the preheating chamber. Any other suitable means may of course be employed to support the runway structure.

The far end of the preheating chamber is closed as far as possible against the escape of heating gases from the chamber or the seepage of outside air into the chamber. To this end, an end wall and part side wall 29 is fitted into the chamber about the runway structure, which extends outwardly away from the chamber. An adjustable wall member 30 is located at the top of the farther end of the chamber to close the same. This member may be moved up or down to accommodate given operating conditions.

Special provision is made at the far end of the preheating chamber for the escape of spent heating gases. The structure shown in Figs. 1, 2 and 4 comprises lateral conduits 31 connecting with downwardly extending vertical side conduits 32. One of these vertical conduits (see Fig. 4) may advantageously connect with a stack or chimney 32' provided with a damper (not shown). Both of the vertical side conduits terminate with a laterally disposed cross conduit 33. A centrally provided conduit 34 extends vertically downward from at or near the center of the passageway of the preheating chamber and terminates at its lower end with the said laterally disposed cross conduit. The lower lateral conduit in turn terminates with a connection 35 associated with a suction fan and stack or chimney (not shown).

Figure 2:
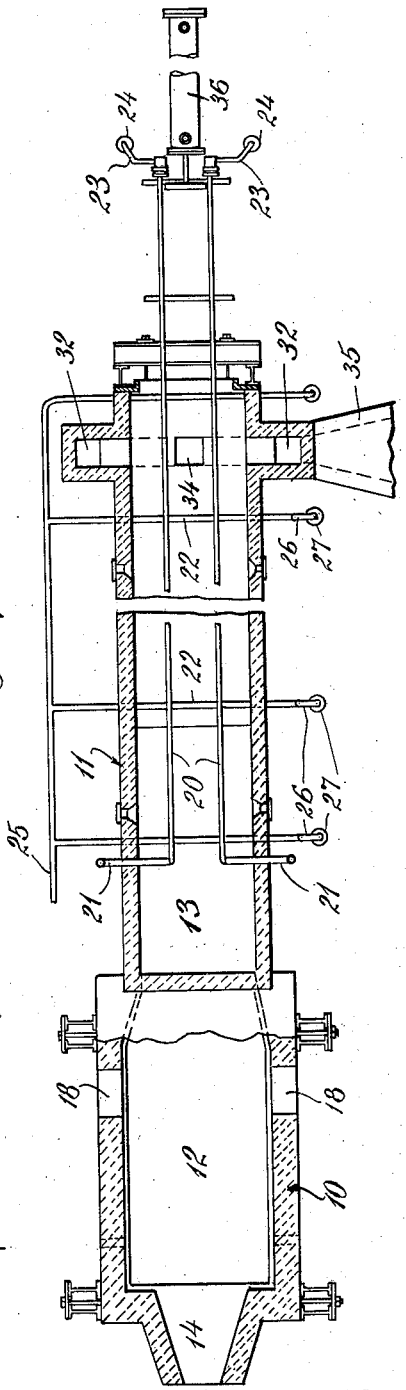
Fig. 2 is a top section along the broken section line 2—2 of Fig. 1.

The runway structure in the preheating chamber extends at its extreme end to a hydraulic ram 36 appropriately supported by a structure 37. Sufficient space is provided between the end of the preheating chamber and the hydraulic ram structure to permit the loading of stacks of copper cathodes on the runway structure. As shown in Fig. 1, the runway structure is loaded with a plurality of stacks of copper cathodes 38, the stacks being separated by a single vertically disposed cathode 39. A loading platform and means for conveying cathodes to the runway structure are used, although they are not shown in the drawings.

The copper cathodes may be piled, stacked or arranged in different ways. In the present preferred practice of the invention, they are stacked according to the manner shown in Figs. 7 and 9. That is to say, an appropriate number of cathodes are piled on top of one another on the runway structure. A single cathode 40 vertically disposed is placed between adjacent stacks. A vertically disposed cathode serves to keep the individual cathodes of each stack in place. Unless an intervening partition wall member of this kind is placed between the stacks, the cathodes tend to buckle and telescope into one another.

In the arrangement shown in Fig. 7, it will be seen that the vertically disposed cathode is of a height substantially not much higher than the stacks of cathodes. If extensive protruding cathode corners extend into the passageway of the preheating chamber, the heating gases tend to melt those corners. Furthermore, if the vertically disposed cathodes are large in respect to the stacks, they serve to act as baffles to the circulating heating gases. To avoid baffling of gases and melting of exposed corners, the vertically disposed cathode is cut to an appropriate size to conform to the size of the stacks. Those shown in Fig. 7 have their lower corners cut out to provide a space around the longitudinally disposed hollow pipes.

In Figs. 6 and 8, a vertically disposed cathode 41 is shown as one that has been diagonally cut in half from corner to corner, which makes it triangular in shape. It is placed in respect to the stacks on the runway structure as shown, its converging sides terminating below the stacks. In order to avoid baffling effects and melting of the lower corners, the lower corner is cut off as shown.

Referring to Fig. 9, it will be seen that more than one runway structure may be provided in a tunnel of a preheating chamber. Two or more runways may be employed to fit operating conditions.

The above described apparatus may be employed as follows in the practice of the process of the invention;

Suitably stacked cathodes of desired height are placed on the runway structure 20, symmetrically positioned with respect to the spaced longitudinally disposed hollow pipes 21, between the far end of the preheating chamber structure 11 and the hydraulic ram 36. A single cathode of desired configuration is placed vertically between adjacent stacks. A number of stacks may be placed on the open runway. Another cathode is advantageously placed vertically between the stack nearest to the hydraulic ram and the plunger head of the hydraulic ram.

In order to advance the stacks of copper cathodes along the top of the runway toward the refining furnace, the hydraulic ram is set in operation. As the plunger head pushes against the first stack, all of the stacks are simultaneously and progressively advanced. When the plunger head has gone forward substantially its full length, it is returned; and an open space is left for more stacks of cathodes. The open runway is again loaded with stacks of cathodes, and the operation of advancing them through the preheating chamber is repeated. In due time, the runway structure will be completely loaded with stacks of copper cathodes.

Fuel and air are introduced into the combustion zone of the refining furnace, which may advantageously be the telescoping opening 14. On ignition of the fuel, hot combustion gases are formed that fill the refining furnace chamber 12 and then find their way through the tunnel-like passageway 13 of the preheating chamber structure 11. As the hot combustion gases circulate around the stacks 38 of copper cathodes supported on the runway structure 20, they are preheated.

The hydraulic ram 36 is continued in operation until a number of stacks of copper cathodes have fallen from the runway structure onto the draining shelf or hearth 16. When the stacks fall to the hearth, the cathodes lose their relative position one to the other. In fact, the cathodes tend to pile on top of one another in the form of a heap. It is of course obvious that for each forward movement of the hydraulic ram plunger, additional stacks of cathodes will be deposited in the refining furnace.

Hot combustion gases formed in the combustion zone of the refining furnace contact with exposed surfaces of the copper cathodes resting on the draining shelf or hearth 16. The composition and temperature of the combustion gases are carefully regulated so as to form what may be considered a purifying atmosphere. As the hot combustion gases strike the copper cathodes resting on the draining shelf or hearth, copper is progressively melted and runs or trickles toward the well or reservoir 15 of the furnace.

The purifying atmosphere is controlled by regulating the amount of air and fuel used in the formation of the combustion gases in accordance with the nature and composition of the impurities present in the copper charge. Periodic determinations of the character and amount of impurities present in the molten copper are made, and the regulation of the purifying atmosphere is conducted in accordance therewith. The control contemplated is so carefully and minutely made that the chemically reactive quality of the heating gases may, for example, be maintained in substantially chemical equilibrium with the copper, but oxidizing with respect to the impurities. As molten copper flows or trickles away from the pile of copper cathodes on the draining shelf, it is substantially purified. The molten copper eventually reaches the well or reservoir 15, the impurities volatilizing and/or forming as a slag on the top surface thereof.

Molten copper and slag are together or separately drawn off through the hole or opening 17 from time to time while further stacks of copper cathodes are dropped into the refining furnace. It will of course be apparent that the copper cathodes are not to fall into the molten metal bath maintained in the well or reservoir 15.

The stacks of cathodes on the runway structure nearest to the refining furnace may be preheated, due to their proximity to the refining furnace and the hot combustion gases, to a point at which they begin to melt. Such molten copper trickles down onto the sloping bottom of the preheating chamber, and flows by gravity onto the draining hearth or shelf 16 and on into the well or reservoir 15.

After the heating gases have traversed the full length of the tunnel-like passageway 13, they will have given up a very substantial amount of their heat. The spent gases ultimately find their way through the lateral conduits 31, the vertical conduits 32 and 34, and the laterally disposed cross conduit 33 to a stack or chimney. Thus, some of the gases may be permitted to escape through the stack or chimney. The stack or chimney may have a height adapted to provide adequate suction draft. If, however, an induced draft is desired, a suction fan (not shown) may be employed to induce the necessary draft. For this purpose, a special stack or chimney (not shown) is advantageously employed in conjunction with the fan.

As pointed out above, the purification step contemplates such a nicety of control of the intensity of the reactive quality of the atmosphere above and around the copper cathode charge that a melting and refining operation may be simultaneously carried out. This means that the usual so-called reducing, oxidizing or neutral flames are not adequate. Nor does, for example, mere copper oxidizing or copper reducing fulfill the requirements.

In reduction metallic oxides by means of carbon monoxide, the reaction is usually written as follows:

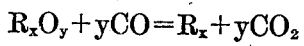

$$R_xO_y + yCO = R_x + yCO_2$$

Under certain conditions the equation is reversible. Carbon monoxide (which has reducing power) obtained from the combustion of the hydrocarbon fuels is mixed with carbon dioxide (which has oxidizing power). The carbon dioxide tends to retard the reducing effect of the carbon monoxide until a point is reached where one offsets the other and no further reaction or equilibrium occurs. With a further increase of carbon dioxide, however, oxidation occurs until a point is reached where equilibrium again sets in. In a similar manner, with a further increase of carbon monoxide, reduction occurs until a point is reached where equilibrium again sets in.

The properties of carbon monoxide and carbon dioxide necessary to neutralize the effect of one another vary with the metallic constituents and the temperature of the charge. It is entirely possible to have a reducing atmosphere in a furnace with oxidation taking place. This dual action takes place, for example, when at least two metals are present in the charge, which vary sufficiently in their requirements to effect reduction. A similar situation obtains when the heating gases are in chemical equilibrium in respect to one of the metals, but not to another. In that event the latter can be reduced or oxidized while the former metal remains unaffected.

The requirements for decomposing the different metallic oxides vary greatly. Thus, those of gold, silver, and mercury are decomposed by heat at relatively low temperatures. Other metallic oxides, such as those of copper, are not decomposed as easily. They require smelting gases of relatively high temperatures, as well as the use of special reducing agents for the more refractory oxides. Since oxidation is the opposite of reduction, it presents the same varying requirements. In using these different requirements to eliminate impurities from a metal, regulating the composition of the gases to suit the constituents of the charge is necessary to obtain the desired result, which in the case of copper cathodes, for example, is to produce the maximum amount of copper containing no or the minimum amount of impurities. In practicing the invention on copper cathodes, it is possible to melt and refine the metal in such manner that substantially pure copper is obtained, while the impurities are simultaneously oxidized, and pass off as vapors or else go into the slag.

This means that the reactive quality of the heating gases surrounding the charge must be so carefully and minutely controlled that although the gases will oxidize the impurities in the copper the copper itself will be unaffected. The heating gases are maintained in substantial chemical equilibrium with the molten copper.

In other words, a selective action (such as of the oxidizing gas for the impurities instead of for the copper) can be effected by careful control of the atmosphere around and above the charge that is to be melted and refined. No such action is possible with the so-called oxidizing flames heretofore employed. These oxidizing flames oxidize the impurities, it is true, but they also oxidize a substantial part of the copper. A further refining (reducing) operation is then necessary to convert the copper oxide into copper. In a similar manner the so-called reducing flames reduce impurities in addition to the copper and a further refining (oxidizing) operation is necessary to remove the impurities.

We claim:

1. In a process for refining copper, the step of preheating a plurality of copper cathodes as they are progressively advanced to a refining furnace, and then depositing the preheated copper cathodes on a draining shelf above the level of a pool of molten copper maintained in the refining furnace.

2. A method of refining copper according to claim 1, in which the copper cathodes are stacked, the stacks of copper cathodes being formed by placing one cathode onto another until each stack is the desired height, and placing at least one cathode between adjacent stacks to act as a partition wall to prevent telescoping of the stacks.

3. In an apparatus for the refining of copper, a preheating chamber having a passageway communicating with a refining furnace, and means in association with said preheating chamber for progressively advancing a plurality of copper cathodes therethrough, said refining furnace being provided with a draining shelf for the deposition of preheated cathodes.

4. A copper refining apparatus according to claim 3, in which the means for progressively advancing the copper cathodes consisting of a runway structure comprise longitudinally spaced hollow pipes appropriately supported, said pipes being adapted for the passage therethrough of cooling water.

5. A copper refining apparatus according to claim 3, in which the means for progressively advancing the copper cathodes consisting of a runway structure comprise longitudinally spaced hollow pipes appropriately supported on laterally spaced hollow pipes, and means for passing a cooling liquid medium through both the longitudinally and laterally spaced pipes.

6. A process for refining copper according to claim 1, in which hot combustion gases are impinged against exposed surfaces of the copper cathodes resting on the draining shelf to melt the copper progressively while subjected to a purifying atmosphere, and controlling said purifying atmosphere by regulating the amount of air and fuel used in the formation of said combustion gases in accordance with the nature and composition of the impurities present in the cathodes, said regulation being effected in accordance with periodic determinations of the character and amount of impurities present in the molten copper.

In testimony whereof we affix our signatures.

HARRY H. ALEXANDER.
ALEXANDER W. CARROLL.